US011994282B2

(12) United States Patent
Duran

(10) Patent No.: US 11,994,282 B2
(45) Date of Patent: May 28, 2024

(54) UNIVERSAL SUBMERSIBLE LED LAMP FIXTURE/LUMINAIRE

(71) Applicant: PROAGUA PRODUCTS LLC, Cheyenne, WY (US)

(72) Inventor: Guillermo Duran, Cheyenne, WY (US)

(73) Assignee: Proagua Products LLC, Cheyenne, WY (US)

( * ) Notice: Subject to any disclaimer, the term of this patent is extended or adjusted under 35 U.S.C. 154(b) by 0 days.

(21) Appl. No.: 18/107,890

(22) Filed: Feb. 9, 2023

(65) Prior Publication Data

US 2023/0194075 A1 Jun. 22, 2023

(30) Foreign Application Priority Data

Dec. 10, 2021 (MX) .................. MX/A/2021/015420

(51) Int. Cl.

| | |
|---|---|
| ***F21V 31/00*** | (2006.01) |
| ***F21S 8/02*** | (2006.01) |
| ***F21V 23/00*** | (2015.01) |
| ***F21V 23/06*** | (2006.01) |
| ***F21V 29/70*** | (2015.01) |

(Continued)

(52) U.S. Cl.

CPC ............ *F21V 31/005* (2013.01); *F21S 8/022* (2013.01); *F21S 8/024* (2013.01); *F21V 23/009* (2013.01); *F21V 23/06* (2013.01); *F21V 29/70* (2015.01); *F21W 2131/401* (2013.01); *F21Y 2115/10* (2016.08)

(58) Field of Classification Search

CPC ...... F21V 31/005; F21V 23/009; F21V 23/06; F21V 19/003; F21V 29/70; F21S 8/024; F21S 8/022; F21W 2131/401; F21Y 2115/10

See application file for complete search history.

(56) References Cited

U.S. PATENT DOCUMENTS

| | | | | |
|---|---|---|---|---|
| 5,122,936 A | 6/1992 | Guthrie | | |
| 6,616,291 B1 * | 9/2003 | Love | ...................... | H05B 45/20 362/240 |
| 9,991,654 B1 * | 6/2018 | DePhillips | ............ | H01R 13/52 |

(Continued)

FOREIGN PATENT DOCUMENTS

| | | |
|---|---|---|
| CN | 205919244 U | 2/2017 |
| CN | 111322563 A | 6/2020 |
| CN | 216280851 U * | 4/2022 |

*Primary Examiner* — Zheng Song
*Assistant Examiner* — Glenn D. Zimmerman
(74) *Attorney, Agent, or Firm* — Akerman LLP

(57) ABSTRACT

A universal submersible LED lamp/luminaire adapted to be placed inside a tube embedded in walls or floors of swimming pools, tubs, jacuzzies, or other bodies of water includes a hermetically coupled tubular casing defining posterior and anterior ends. The posterior end includes a connector, configured with an arrangement of five round pins for four connection configurations. The anterior end comprises a waterproof sealed lens and internally houses a panel of LEDs. An LED lighting control electronic board is housed inside the casing and is connected to the connector and LEDs. The board integrates microchips programmed to execute a pattern and sequence automated switching on of the LEDs and that are activated depending on the connection position of a power supply cable in connector.

9 Claims, 4 Drawing Sheets

(51) Int. Cl.
*F21W 131/401* (2006.01)
*F21Y 115/10* (2016.01)

(56) References Cited

U.S. PATENT DOCUMENTS

| | | | | |
|---|---|---|---|---|
| 2006/0176686 | A1* | 8/2006 | McVicker | F21S 9/022 362/183 |
| 2015/0247632 | A1* | 9/2015 | McGilvray | F21V 31/005 362/267 |
| 2019/0282016 | A1* | 9/2019 | Long | F21V 33/0028 |
| 2020/0386388 | A1* | 12/2020 | Dyck | E04H 4/1245 |
| 2022/0338359 | A1* | 10/2022 | Ramirez Ortiz | H01R 13/405 |

* cited by examiner

UNIVERSAL SUBMERSIBLE LED LAMP FIXTURE/LUMINAIRE

CROSS-REFERENCE TO RELATED APPLICATIONS

The present application claims priority to Mexican Patent Application No. MX/a/2021/015420, filed Dec. 10, 2021, the disclosure of which is hereby incorporated herein by reference in its entirety.

FIELD OF THE INVENTION

The present invention falls within the field of the industry of lamps and lighting systems, in general; in particular it is related to submersible lamps to be placed in swimming pools or the like. More specifically, the invention relates to a Universal submersible LED lamp light fixture/luminaire.

BACKGROUND OF THE INVENTION

Modern swimming pools require good lighting, which not only improves the appearance of the pool, but also allows you to enjoy its use at any time of the day without risk of accidents or shocks due to lack of lighting.

For this, there are two types of lamps for swimming pools, halogen lamps and LED lamps, however, halogen lamps have a series of undesirable characteristics, for example, they require a specific and more delicate installation, so they cannot be install on any surface, halogen lamps also emit heat and ultraviolet radiation.

Unlike this, with LED lamps, it is easier to install and can be installed on any surface, they include greater energy efficiency, their maintenance is easier and there is more variety, such as cold, warm, semi-warm or colored lights.

In this way, there are currently various brands and each of them has a specific programming to control the lighting of the lights, however, it is common for one or more of the lamps placed in the pool to break down, and in that time it is necessary to replace them.

These lamps can be installed in swimming pools or different bodies of water such as SPAs, and it is normally necessary to install several lamps in order to efficiently cover the surface to be illuminated. They can be embedded in the pool walls or in the pool floor.

In order to control the switching on and off of the lamps, there are various automation systems or manual control systems. However, each of the main brands of pool lamps has its own automation system or manual control system that is different from that of the other brands, which is why when there is a need to replace one of the lamps, the process becomes complicated, since it is necessary to find a lamp that comprises the same automation system so that the lamp can work in a correct way.

To solve this problem it is necessary to have a universal lamp, which can be adapted to any brand and/or automation system and can work correctly and optimally.

The present invention refers to a submersible LED lamp that includes various operating systems to control light on, and a connection system with various options, in such a way that according to the way of connection, the lamp will choose the appropriate operating system. so that it can be adapted and adapted to the automation or manual control system that the rest of the lamps comprise, which is why this lamp is universal, since it can be connected to lighting systems of other brands and read the same operating system for control, change colors and programs, as well as turn on and off correctly.

A search was carried out to determine the closest state of the art, finding the following information:

A document was found of a utility model number CN205919244U of Lin Huaxiang and Xu Yaoyuan published on Feb. 1, 2017 which discloses a swimming pool lamp, including lampshade, lamp plate, body, impeller cover, water blade, stator, sealed cap and check valve, the lamp plate cover is set on the body and installed in the housing space that the lamp shade and this coupling of the body is formed, and the stator is fixed in the housing space housing into which the body and the sealed tectiform, the water sheet passes through the porcelain shaft configuration impeller cover, and the body between the cover is set on the periphery of the stator, the check valve is fixed at the lower end of the inner impeller cover through the one-way valve space. Install a pool lamp in the filter equipment that has the pool of the water pump, in the pool lamp installation of the pool water inlet department, the rivers promote the water sheet and rotate, and the rotor that is installed in the water sheet will rotate for the stator to provide lighting power for the lamp plate. Installing the pool lighting installation from other local wiring can be avoided in this way, on the one hand, energy can be saved, on the other hand, it can also be reduced and the lighting installation is installed to give the swimmer the inconvenience that the trip brings.

However, this lamp does not include operating systems for automatic or manual control of the controller, to change colors and programs, as well as turning lights on and off, nor does it include elements to be able to couple the lamp to different systems of different brands to be able to adapt and controlled in the same way as the rest of the lamps connected in the pool. In addition, it does not have the same cylindrical shape as the lamp of the present invention, which allows it to adapt to niches in swimming pools.

US patent document U.S. Pat. No. 5,122,936 dated Jun. 16, 1992, by inventor John H. Guthrie, was also found, which discloses an underwater light assembly to be mounted on the surface of a pool wall, includes a backing plate that is adjacent to said pool surface when the assembly is mounted to said wall, a lens hermetically mounted relative to said backing plate and defining a waterproof chamber therewith, and an electric light source or lamp mounted within said chamber and connectable to an electrical power source by means of an electrical cable extending from said electrical light source or lamp through a waterproof seal in said backing plate. An annular shell member extends around and rearward from the periphery of the backing plate. The annular housing element has a plurality of openings formed around its circumference, so that when said light assembly is mounted on said pool surface, pool water can flow through a compartment defined by said surface, the housing element and the backing plate However, this lamp does not refer to a replacement lamp that includes elements that allow it to be coupled or adapted to different automation systems or manual systems for operating control, changing colors, as well as turning lights on and off to function accordingly. with the rest of the lamps previously connected in the pool in which the replacement is required. In the same way, it does not include different operating systems that allow it to function in accordance with the operating systems of the main brands of lamps.

A document was found number CN111322563A of the inventors Lu Qingqiu and Li Weijian that was published on Jun. 23, 2020, which publishes a swimming pool light, referring to illumination equipment which objective is to resolve the problem that an existing lighting lamp in a swimming pool that is problematic to service or give maintenance. The key points of the technical schematic are the following: the lighting fixture in the pool includes a body of a portable light and a heat conductor and a light source; a mounting slot in the portable light body; both ends of the mounting slot are open structures, in which the screen of the light source that emits the light is on one sealed end and in the other end it is sealed and covered with a cover top; an internal slot of heat transfer is on the mounting slot; the exterior wall of the interior slot of a metal heat transfer is mounted next to the internal wall of the installation plate, and a mounting slot is formed in the body; the light source includes a PCB provided with a light cable, in which the PCB is inserted and the holding slot, and the lamp cord are connected electrically to the circuit in the PCB; the main supply of energy and the lamp cord are connected to a thermo resistor in series PTC; and the thermos resistor PTC is set on the holding slot. In alignment to the swimming pool light fixture, to reduce the probability to suffer damage, the frequency of service is reduced and therefore, any user can service the pool light comfortably.

However, like the lamps in the previously mentioned documents, this lamp does not include means or elements that allow it to be coupled to an automatic or manual control operating system that controls the correct handling of color changes or selecting programs, as well as the lighting on and turning off other lamps that are previously in the pool, therefore this lamp cannot be used as a universal lamp replacement, since it could not be correctly synchronized with the operation of the other lamps in the pool.

As can be seen, there are various types of lamps for swimming pools, but in order to have correct management control, changing colors and programs, as well as turning them on and off, they must belong to the same brand or the same supplier to work in synch according to a peer operating system. However, when one of the pool lamps stops working, it is difficult to replace it since it must be replaced by a lamp of the same brand and with the same automatic or manual control operating system.

The lamp described here aims to solve this problem, with a lamp that works universally and can be replaced, containing different forms of connection in order to choose the appropriate operating system to connect and synchronize with the rest of the lamps installed in the pool and that, in this way, the lamp can work correctly.

OBJECTIVES OF THE INVENTION

The main objective of the present invention is to make available a universal submersible LED lamp/luminaire that can replace lamps of different brands, coupling to the appropriate operating system for correct control, color change and program selection, as well as correct on and off of lights Another of the objectives of the present invention is to provide said universal submersible LED lamp/luminaire that is easy to install and easy to maintain, having a simple connection mode that allows the selection of the appropriate operating system easily.

Another objective of the present invention is to make available such a universal submersible LED lamp/luminaire that is efficient and functional.

Another of the objectives of the present invention is to provide said universal submersible LED lamp/luminaire so that it can be installed by anyone without the need for advanced knowledge about lamp installation.

Yet another of the objectives of the present invention is to provide said universal submersible LED lamp/luminaire, which also offers a connection orientation on the back of the lamp with the plug connector on the cable to favor its universal connection.

And all those qualities and objectives that will become apparent when carrying out a general and detailed description of the present invention based on the illustrated modalities.

BRIEF DESCRIPTION OF THE INVENTION

Generally, the universal submersible LED lamp/luminaire in accordance with the present invention consists of a hermetically coupled tubular casing defining a rear end and a front end; the rear end comprises a waterproof PX power supply socket or female connector, configured with a five round pin arrangement for four connection configurations and the front end comprises a waterproof sealed lens, and internally houses a panel of a plurality of LEDs a LED lighting control electronic board is housed inside said tubular casing and is connected to the waterproof PX power supply female connector or plug and to the Plurality of LEDs, and integrates a plurality of microchips and preferably four microchips, each one programmed and configured to execute and control a pattern and sequence of colors and operating programs as well as the correct automated lighting of the plurality of LEDs that are activated depending on the connection position of a connector of the power supply cable in the female connector or waterproof PX power plug.

In the preferred embodiment of the invention, said tubular casing has a rear end and a front end, both ends have an outer cable, the rear end being adapted to threadedly receive a rear tubular cover at the joint of which is arranged a waterproof sealing element or O-ring; Said rear cover comprises a central hole with an interior cable configured to receive a waterproof sealed PX female connector or plug in a threaded manner, configured with an arrangement of five round pins for four connection configurations; Said tubular casing internally has an annular edge close to its front end, configured to receive and support a heat sink that is housed in the front end and on which a panel with a plurality of LEDs is fixed with fixing means so that the heat produced by the LEDs in their on state is dissipated by means of said heat sink; a lens is arranged on the contour of the front end of the tubular casing and is held by a flange with waterproof sealing elements or O-ring, which includes an inner cable and is screwed onto the front end of said tubular casing, at the joint of which it has a waterproof sealing element or O-ring; an electronic control board for the lighting of the LEDs is housed inside said tubular casing and is connected to the waterproof PX power supply socket or female connector and to the Plurality of LEDs, and integrates a plurality of microchips and preferably four microchips, each one programmed and configured to execute and control an automated lighting pattern and sequence of the plurality of LEDs that are activated based on the connection position of a connector of a power supply cable in the PX power supply socket or WATER resistant receptacle.

In the preferred embodiment of the invention, said flange comprises a protruding annular edge and externally in its tubular section it presents an external cable to be screwed into another casing or other fixation means.

Said waterproof PX power supply female connector or plug, at the rear end of the lamp/luminaire is configured with an arrangement of five round pins for four connection configurations, it comprises a perimeter surface in which there are four different indicators that refer to the different operation and lighting programs of the plurality of LEDs, so that the connection position of the connector of the power supply cable in one position or another will allow executing and controlling an automated lighting pattern and sequence of the plurality of LEDs.

Said universal submersible LED lamp/luminaire is adapted to be placed inside a tube embedded in the walls or floor of the pool, bathtubs, Jacuzzi or other bodies of water, in which the lamp is connected from the rear with a connector cable from the pool lighting system.

In one of the forms of the invention, the lamp includes a gasket at each of its ends to allow a hermetic seal at the joints with the flange and the main connector, preventing the passage of water into the interior of the lamp.

In the preferred embodiment of the invention said waterproof PX power supply socket or socket comprises an external cable, so that, after connecting the power supply cable connector, a waterproof cap is screwed on which is mounted on the connector of the power supply cord to keep the lamp and connections secure.

In the preferred embodiment of the invention, said heat sink is in physical contact with the internal wall of said tubular casing to favor heat dissipation.

In order to better understand the characteristics of the invention, the present description is accompanied, as an integral part thereof, by the drawings with an illustrative but non-limiting nature, which are described below.

Figure 1:
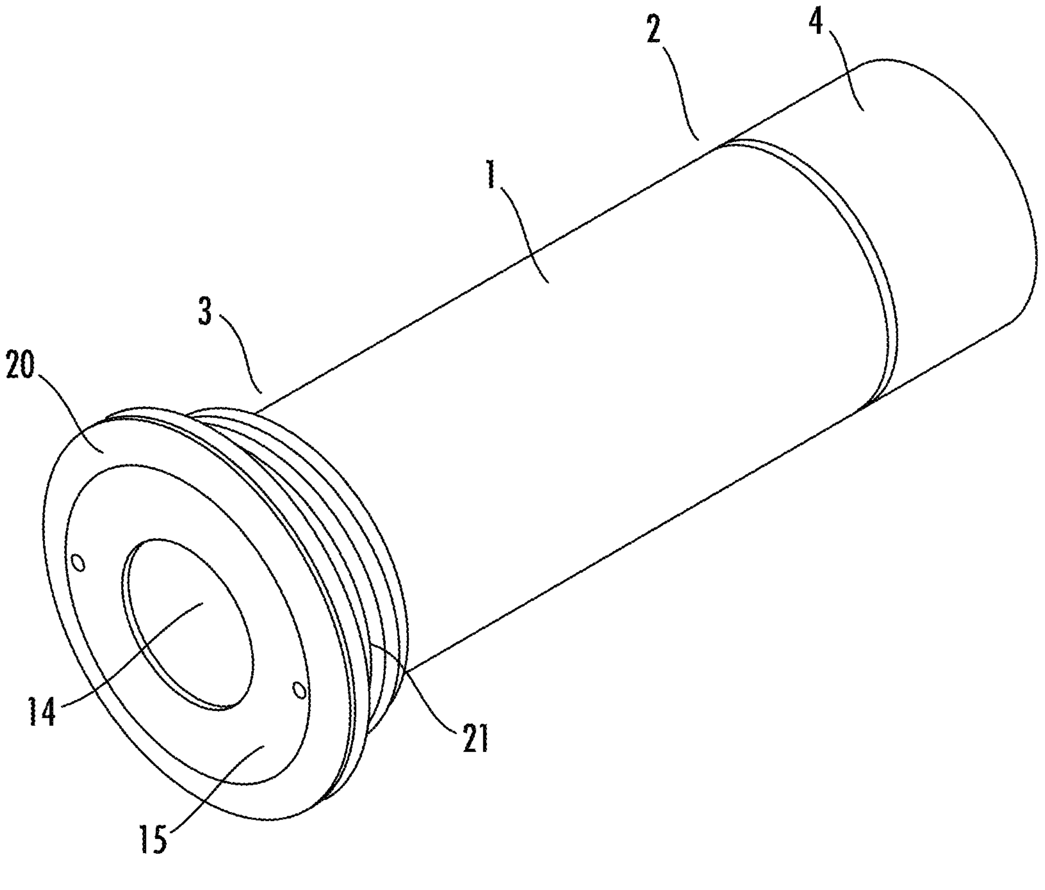
FIG. 1 shows a conventional perspective view of the universal submersible LED lamp/luminaire, in accordance with the present invention.

For a better understanding of the invention, a detailed description of some of its modalities will be made, shown in the drawings that are attached to this description for illustrative but not limiting purposes.

DETAILED DESCRIPTION OF THE INVENTION

The characteristic details of the universal submersible LED lamp/luminaire are clearly shown in the following description and in the attached illustrative drawings, using the same reference signs to indicate the same parts.

Figure 2:
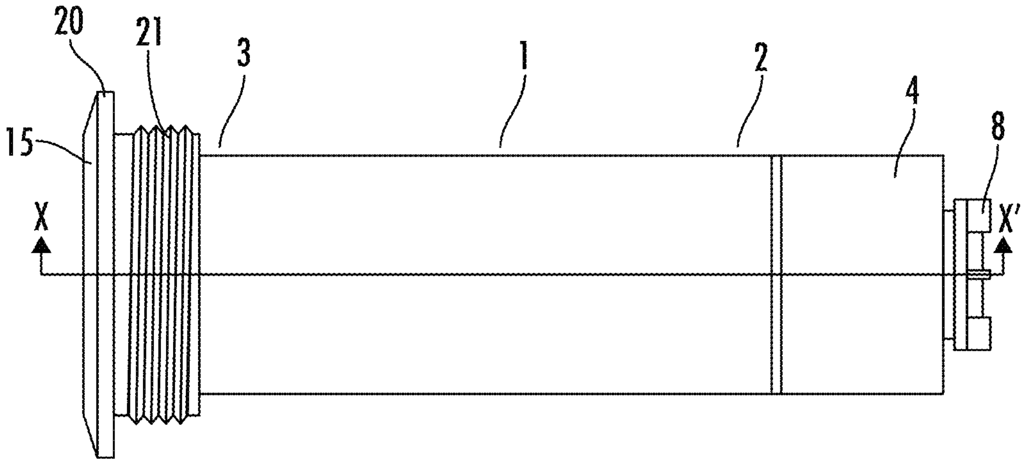
FIG. 2 shows a side view of the universal submersible LED lamp/luminaire, in accordance with the present invention.
Figure 3:
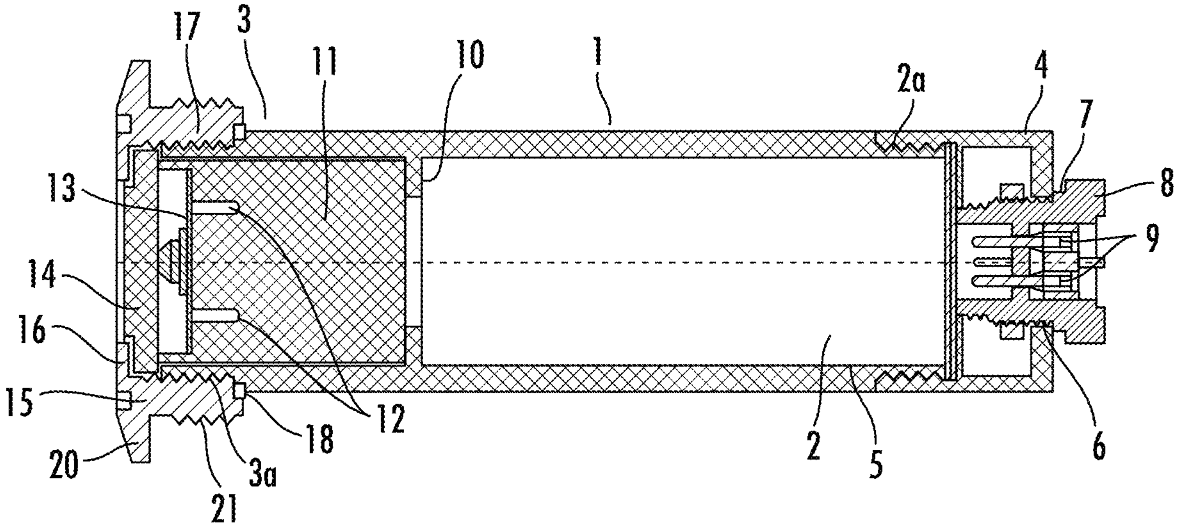
FIG. 3 shows a longitudinal section in the X-X' axis shown in Figure #2, of the universal submersible LED lamp/luminaire, in accordance with the present invention.
Figure 4:
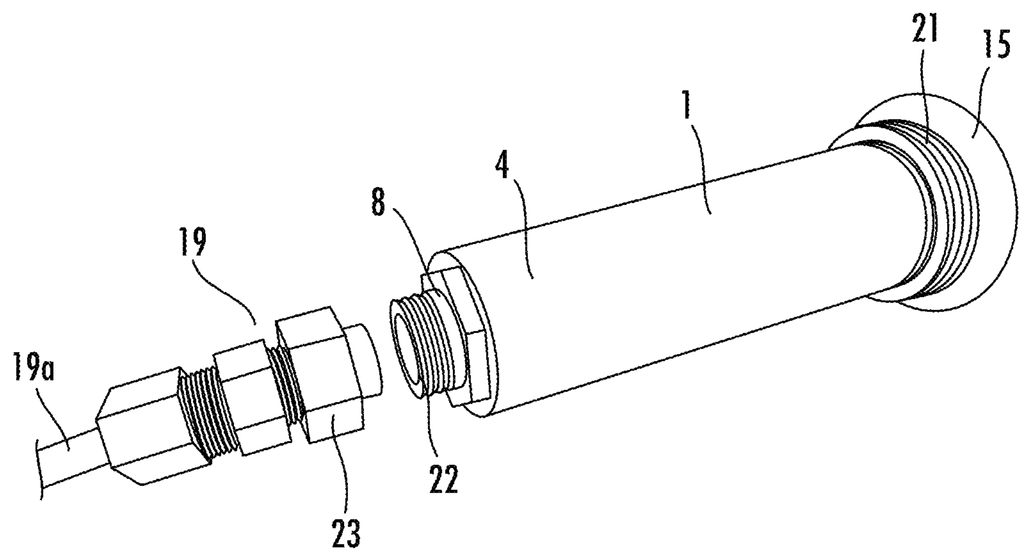
FIG. 4 shows a rear perspective view of the universal submersible LED lamp/luminaire, and the connector of a power supply cable, in accordance with the present invention.
Figure 5A:
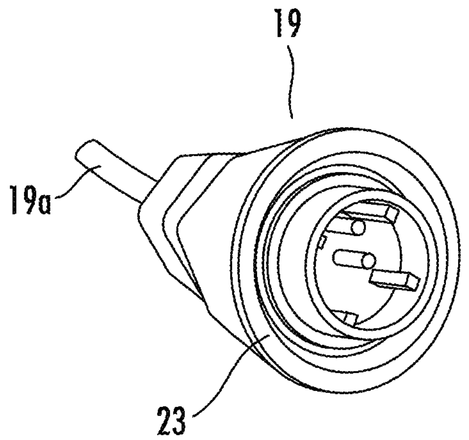
FIGS. 5*a* and 5*b* show conventional perspective views of the waterproof PX power supply socket or plug and the connector of a power supply cable, respectively.
Figure 5B:
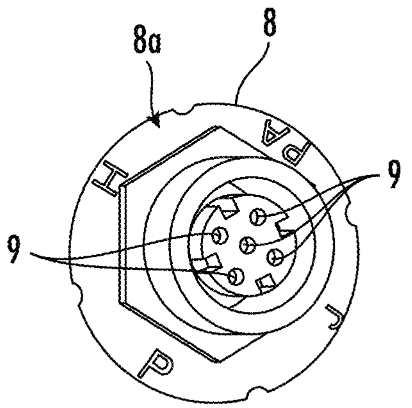
Figures 6A, 6B, 6C, 6D:
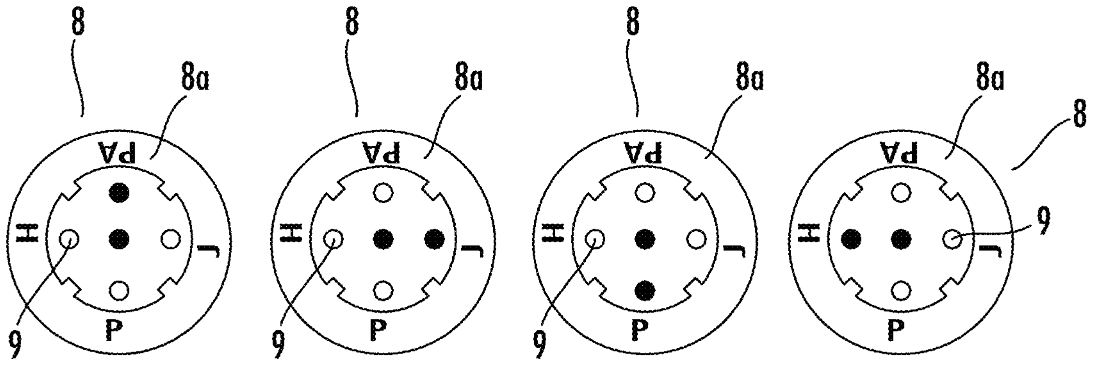
FIGS. 6*a*, 6*b*, 6*c* and 6*d* illustrate front views of the different connection positions of a connector of a power supply cable in the waterproof PX power supply socket or socket, in accordance with the present invention.

Referring to FIGS. 1 to 3 and paying special attention to FIG. 3, the universal submersible LED lamp/luminaire in accordance with the present invention consists of a tubular casing (1) comprising a rear end (2) and a front end (3) both ends have an outer cable (2*a*, 3*a*), the rear end (2) being adapted to threadedly receive a rear tubular cover (4) at the joint of which is a waterproof sealing element or O-ring (5); Said rear cover comprises a central hole (6) with an inner cable configured to receive a waterproof PX female connector or plug (8) in a threaded manner with waterproof sealing (7), configured with an arrangement of five round pins (9). for four connection configurations; Said tubular casing (1) internally has an annular edge (10) close to its front end (3), configured to receive and support a heat sink (11) that is housed in the front end of the tubular casing (1) and on which is fixed with fixing means (12) a panel of a plurality of LEDs (13) so that the heat produced by the LEDs in their on state is dissipated by means of said heat sink (11); a lens (14) is arranged on the contour of the front end (3) of the tubular casing (1) and is held by a flange (15) with waterproof sealing elements or O-ring (16), which includes an inner cable (17) and is screwed onto the front end (3) of said tubular casing (1), at the joint of which a waterproof sealing element or O-ring (18) is arranged; an electronic ignition control board (not shown) of the LEDs is housed inside said tubular casing (1) and is connected to the female connector or waterproof PX power supply plug (8) and to the plurality of LEDs, and integrates a plurality of microchips (not shown) and preferably four microchips, each one programmed and configured to execute and control a predetermined pattern and sequence of automated lighting of the plurality of LEDs that are activated depending on the connection position of a connector (19, see FIGS. 4 and 5*a*) of a power supply cable (19*a*) into the waterproof PX power supply socket or plug (8).

Said flange (15) comprises a protruding annular edge (20) and externally in its tubular section it presents an external cable (21) to be screwed into another casing or other fixing means (not shown).

Referring to FIGS. 4 to 6*d*, said waterproof PX power supply socket or female connector (8), at the rear end (2) of the lamp/luminaire, is configured with an arrangement of five round pins (9) for four configurations connection, it comprises a perimeter surface (8*a*) in which there are four different indicators (P, J, PA, H) that refer to the four different operation and lighting programs of the plurality of LEDs, so that the position Connecting the connector (19) of the power supply cable (19*a*) in one position or another will allow executing and controlling a predetermined pattern and sequence of automated lighting of the plurality of LEDs.

Said waterproof PX power supply female connector or plug (8) comprises an external cable (22), so that, after connecting the connector (19) of the power supply cable (19*a*), a waterproof hood (23) that is mounted on the connector (19) of the power supply cable (19*a*), to keep the lamp and connections safe.

The invention has been sufficiently described so that a person with average knowledge in the matter can reproduce and obtain the results that we mention in the present invention. However, any person skilled in the field of the technique that the present invention is competent may be able to make modifications not described in the present application, however, if for the application of these modifications in a determined structure or in the manufacturing process of this, the matter claimed in the following claims is required, said structures must be understood within the scope of the invention.

What is claimed is:

1. A universal submersible LED lamp/luminaire adapted to be placed inside a tube embedded in the walls or floor of a swimming pool, tubs, jacuzzi or other bodies of water, the lamp/luminaire comprising:

a hermetically coupled tubular casing that defines a rear end and an front end, wherein the rear end comprises a waterproof power supply socket or female connector configured with an arrangement of five round pins for four connection configurations, and wherein the front end comprises a lens a panel of a plurality of LEDs housed inside the front end; and a LED lighting control electronic board housed inside said tubular casing and electrically connected to the waterproof power supply socket or female connector and to the plurality of LEDs, wherein the LED lighting control electronic board integrates a plurality of microchips, each microchip programmed and configured to execute and control a pattern and sequence of automated switching with respect to the plurality of LEDs that are activated depending on the connection position of a connector of a power supply cable in the waterproof power supply socket or female connector.

2. The universal submersible LED lamp/luminaire according to claim 1, wherein said tubular casing has an outer cable at both ends, the rear end being adapted to threadedly receive a rear tubular cover at a joint of which is arranged a waterproof seal element, wherein the rear cover comprises a central hole with an interior cable configured to receive the waterproof power supply socket or female connector in a threaded manner with a waterproof seal, wherein the tubular casing has an internal annular edge close to its the front end configured to receive and support a heat sink housed in the front end and on which the panel with the plurality of LEDs is fixed with a fixing means, wherein the lens is arranged on a contour of the front end of the tubular casing and is held by a flange with waterproof sealing elements, wherein the flange includes an inner cable and is screwed onto the front end of said tubular casing in whose joint a sealing element is arranged as a waterproof seal.

3. The universal submersible LED lamp/luminaire according to claim 2, wherein said flange comprises a protruding annular edge and presents an external cable configured to be screwed into another casing or other fixing means.

4. The universal submersible LED lamp/luminaire according to claim 1, wherein said waterproof power supply socket or female connector comprises a perimeter surface in which there are four different indicators that refer to the different operation programs and lighting of the plurality of LEDs, wherein the connection of the power supply cable connector in one position or another executes and controls an automated lighting pattern and sequence of the plurality of LEDs.

5. The universal submersible LED lamp/luminaire according to claim 1, wherein said waterproof power supply socket or female connector comprises an external cable configured to threadedly receive a waterproof hood mounted on the power cable connector power feed.

6. The universal submersible LED lamp/luminaire according to claim 1, wherein a heat sink is in physical contact with an internal wall of said tubular casing to favor heat dissipation.

7. The universal submersible LED lamp/luminaire according to claim 1, wherein the tubular casing has an internal annular edge close to the front end configured to receive and support a heat sink housed in the front end and on which the panel with the plurality of LEDs is fixed with a fixing means, wherein the lens is arranged on a contour of the front end of the tubular casing and is held by a flange with waterproof sealing elements, wherein the flange includes an inner cable and is screwed onto the front end of said tubular casing, and wherein a sealing element is arranged within a joint between the front end and the flange to provide a waterproof seal.

8. The universal submersible LED lamp/luminaire according to claim 7, wherein the heat sink is in physical contact with an internal wall of said tubular casing to favor heat dissipation.

9. The universal submersible LED lamp/luminaire according to claim 1, wherein the rear end is adapted to threadedly receive a rear tubular cover at a joint of which is arranged a waterproof seal element, and wherein the rear cover comprises a central hole with an interior cable configured to receive the waterproof power supply socket or female connector in a threaded manner.

* * * * *